United States Patent [19]
Lee et al.

[11] Patent Number: 5,367,678
[45] Date of Patent: Nov. 22, 1994

[54] MULTIPROCESSOR SYSTEM HAVING STATICALLY DETERMINING RESOURCE ALLOCATION SCHEDULE AT COMPILE TIME AND THE USING OF STATIC SCHEDULE WITH PROCESSOR SIGNALS TO CONTROL THE EXECUTION TIME DYNAMICALLY

[75] Inventors: Edward A. Lee, Oakland; Jeffrey Bier, Burlingame, both of Calif.

[73] Assignee: The Regents of the University of California, Oakland, Calif.

[21] Appl. No.: 624,376

[22] Filed: Dec. 6, 1990

[51] Int. Cl.$^5$ .................... G06F 9/40; G06F 13/00; G06F 13/36; G06F 13/42
[52] U.S. Cl. .................... 395/650; 364/229.2; 364/230.3; 364/230.4; 364/230.5; 364/264.6; 364/281.3; 364/281.6; 364/281.8; 364/DIG. 1; 395/725
[58] Field of Search .............. 395/650, 325, 375, 800, 395/725

[56] References Cited

U.S. PATENT DOCUMENTS

| | | | |
|---|---|---|---|
| 3,614,745 | 10/1971 | Podvin et al. | 395/650 |
| 4,084,228 | 4/1978 | Dufond et al. | 395/650 |
| 4,219,873 | 8/1980 | Kober et al. | 395/650 |
| 4,318,173 | 3/1982 | Freedman et al. | 395/650 |
| 4,414,624 | 11/1983 | Summer, Jr. et al. | 395/650 |
| 4,503,499 | 3/1985 | Mason et al. | 395/650 |
| 4,553,203 | 11/1985 | Rau et al. | 395/800 |
| 4,591,979 | 5/1986 | Iwashita | 395/800 |
| 4,691,280 | 9/1987 | Bennett | 395/325 |
| 4,726,018 | 2/1988 | Bux et al. | 370/85.5 |
| 4,766,534 | 8/1988 | DeBenedictis | 395/200 |
| 4,807,115 | 2/1989 | Torng | 395/375 |
| 4,814,978 | 3/1989 | Dennis | 395/375 |
| 4,833,638 | 5/1989 | Vollaro | 395/650 |
| 4,847,755 | 7/1989 | Morrison et al. | 395/650 |
| 4,847,757 | 7/1989 | Smith | 395/325 |
| 4,901,224 | 2/1990 | Ewert | 395/250 |
| 4,920,487 | 4/1990 | Baffes | 395/650 |
| 4,964,046 | 10/1990 | Mehrgardt et al. | 395/250 |
| 5,021,947 | 6/1991 | Campbell et al. | 395/700 |
| 5,179,715 | 1/1993 | Andoh et al. | 395/800 |

OTHER PUBLICATIONS

Gilber Sih et al. "A Compile-Time Scheduling Heuristic for Interconnection-Constrained Heterogeneous Process Architectures". IEEE, vol. 4, No. 2, 1993, Transaction of parallel & distribution system.

(List continued on next page.)

*Primary Examiner*—Alyssa H. Bowler
*Assistant Examiner*—Meng-Ai An
*Attorney, Agent, or Firm*—Townsend and Townsend Khourie and Crew

[57] ABSTRACT

A parallel processing architecture centralized controller for containing a granting access to a shared resource for a plurality of processors by use of a transaction schedule. The controller includes a memory for storing a schedule, a pointer into the memory for accessing a particular entry in the schedule, a control circuit for asserting a grant signal to a particular one processor according to the entry in the schedule which the pointer identifies, and an incrementer for advancing the pointer to the next schedule entry upon an assertion of a release signal from the processor granted access to a shared resource. A particular processor accesses the shared resource only when its grant signal is asserted, therefore the controller imposes a particular order on the transaction of the plurality of processors and allows some execution time variations from those execution times which a compiler used in establishing the schedule. The parallel processing architecture includes a shared resource coupling the processor to allow transactions among the processors. Variations in the controller allow monitoring of the shared resource to determine decision paths and to use appropriate portions of the transaction schedule depending upon a particular decision path.

8 Claims, 5 Drawing Sheets

OTHER PUBLICATIONS

Soonhoi Ha et al. "Quan–Static Scheduling for Multiprocessor DSP" Electrical Enginnering & Computer Science Department University of Berkeley.

Gilbert C. Sih et al. "Dynamnic–level scheduling for heterogeneous processor networks", University of California Berkeley, IEEE May 1990.

Bier, J. C., et al., "A Class of Multiprocessor Architectures for Real–Time DSP," *VLSI DSP IV*, IEEE Press, Chap. 29, pp. 295–304 (1990).

Lee, E. A., et al., "Architectures for Statically Scheduled Dataflow," *J. of Parallel and Distributed Computing*, 10:333–348 (1990).

Lee, E. A., et al., "Architectures for Statically Scheduled Dataflow," *Parallel Algorithms and Architectures for DSP Applications*, Chap. 7, (1991).

Lee, E. A., et al., "Static Scheduling of Synchronous Data Flow Programs for Digital Signal Processing," *IEEE Transactions on Computers*, C–36(1):24–35 (Jan. 1987).

Lee, E. A., "Architectures for Statically Scheduled Dataflow," *Electronics Research Laboratory, College of Engineering, UC Berkeley, Memorandum No. UCB-/ERL M89/129, pp. 1–33 (7 Dec. 1989).*

MULTIPROCESSOR SYSTEM HAVING STATICALLY DETERMINING RESOURCE ALLOCATION SCHEDULE AT COMPILE TIME AND THE USING OF STATIC SCHEDULE WITH PROCESSOR SIGNALS TO CONTROL THE EXECUTION TIME DYNAMICALLY

BACKGROUND OF THE INVENTION

The present invention relates generally to parallel processors sharing a resource, and more specifically, the invention relates to a transaction of a parallel processing system having characteristics between those of a self-timed implementation and a fully-static implementation.

Parallel processing systems have multiple processors, each having functions similar to a central processing unit (CPU) of typical PC-type computers in widespread use today. The multiple processors are simultaneously active, calculating various intermediate results and exchanging the intermediate results among the several processors as necessary. The processors access a shared resource, such as a memory or a bus to exchange the information. A term, "transaction," refers to an access of the shared resource by one processor for the purpose of accomplishing communication with another processor. For certain tasks, the transactions must occur in a particular order to produce an accurate result. This is referred to as an inherent transaction order.

A difference between a parallel processing computer and the PC-type computer is the ability of the parallel processing computer to simultaneously execute different software components making up a single task. The term "software component" is taken to mean a program or set of instructions executable by a particular processor. Multiple PC-type computers can operate at the same time, but they typically do not operate in conjunction with each other to execute a single task.

It is precisely the concept of having the plural processors of a parallel processing computer simultaneously operate to solve a single task with the processors exchanging necessary information which sets the backdrop for the present invention. A problem with parallel processing arises when seeking to exchange needed information between the various processors. A first processor which calculates, for example, a series of intermediate sums used by a second processor in other calculations must properly exchange the numbers with the second processor. One way to do this exchange is to provide a bus connecting the two processors. A memory on this bus could store the data being interchanged. Often, the first processor must provide a first intermediate sum before the second processor can complete its first calculation. If the same memory location is used to transmit a second intermediate sum, then the first processor cannot provide the second intermediate sum prior to use of the first intermediate sum as the first intermediate would be overwritten. Likewise, the second processor cannot read its memory location prior to the first processor writing the correct value as an erroneous final calculation will result.

Increasing the number of processors amplifies the difficulty in performing transactions between the parallel processors. Bus contention resolution is necessary if a bus connects processors to one another. Providing a shared memory facilitates exchanging variable amounts of data between the different processors. Thus, a particular processor writes its data needed by one or more other processors to a prespecified data location in the shared memory after gaining access to the bus. The other processor reads the prespecified data location for its data, again after gaining control of the bus. If many different sets of transactions are occurring between different groups of processors, bus contention can contribute to degraded efficiency of solving the common task.

A greater problem can be ensuring that all the different accesses occur in the proper order, with no processor reading its value from the shared resource prior to the correct processor writing the correct value. There are many different solutions to ordering the shared accesses, depending upon the type of information available at a compilation time for the plurality of multiple software components. Two types relevant here are fully-static ordering and self-timed ordering. Fully-static scheduling requires a computer to establish an exact firing time for the software components, as well as their assignment to processors and order of executions. Self-timed scheduling requires that a computer establish an order in which the software components fire on each processor. At run time, each processor waits for data to be available for the next software component in its ordered list, and then fires that software component.

In fully-static ordering, the different processors can rely on an absolute time for their accesses to the shared resource. A programmer provides a compiler with precise information regarding a complete set of transactions for each processor such that the computer can compute an execution time for each of the transactions. The compiler then divides the task and orders the transactions so that no contention for the bus exists and the order of accesses is correct. For example, assume a repetitive task having one minute cycles divided among two processors. The compiler could have the first processor write its value exactly twenty seconds into each cycle. The second processor could read its data exactly forty seconds into each cycle. The problem is that the compiler requires a priori knowledge about the complete set of transactions for each processor and each transaction's execution time. An occurrence of an unscheduled transaction, such as service of a random interrupt, or data dependent iteration or recursion which variably influences the execution time of scheduled transactions, can produce erroneous results. The possibility of producing erroneous results prohibits use of fully-static scheduling for tasks which have unschedulable transactions or which have variable execution times. By "unschedulable," we mean that a compiler has insufficient information at compile time to determine when a transaction should occur. An advantage of fully-static scheduling is that bus contention and ordering are built into the compiled program making it unnecessary to use extra hardware or software to enforce the proper ordering or to resolve bus contention.

Prior art self-timing architectures permit unscheduled events and execution time variations, but at a significant hardware or software overhead. In self-timing architectures, semaphores associated with each data set control access ordering for the plurality of processors. For example, before a processor can access a particular data set, a semaphore associated with the particular data set must indicate that the particular data set is ready for the transaction the processor wants to perform. For example, if the processor wants to read the value stored in a particular storage location, checking the semaphore could indicate whether the data was last read or written. If the semaphore indicates that it was last read, then the processor would not read the value, but it waits until the semaphore indicates that some processor updated the value stored in the shared memory. Associated with this method is a problem of bus contention resolution hardware. For instance, in the example above with the processor desiring to read the particular storage location but finds the semaphore in the wrong condition, the access of the shared resource to test the semaphore can delay the second processor from updating the particular storage location, degrading an efficiency of transaction. Additionally, every time a processor is ready to access the shared resource, the processor needs to resolve any contention for the shared resource if another processor is also ready to access the shared resource. As the number of processors increases, contention and ordering the accesses requires corresponding increases in overhead to manage this semaphore/contention system. The various contending processors could constantly interfere with smooth and efficient transaction of their common task. The system does permit unscheduled tasks and timing variations.

Figure 3:
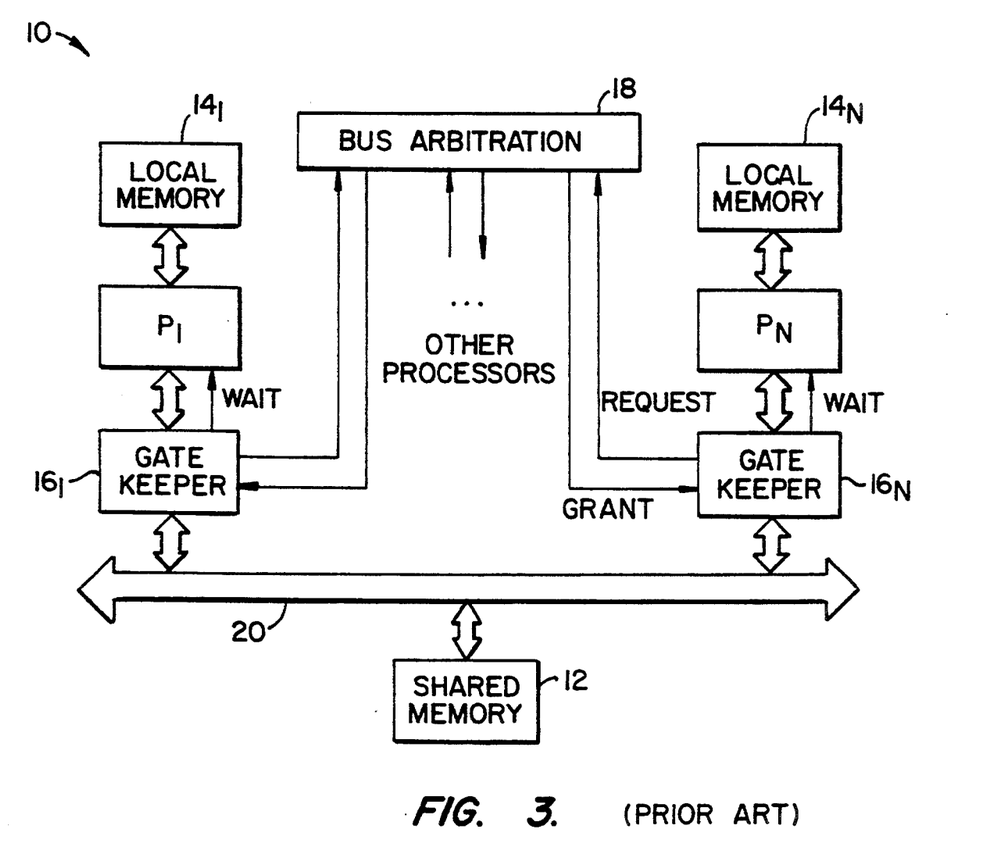
FIG. 3 is a block diagram of a prior art architecture 10.

FIG. 3 is a block diagram of a prior art self-timed architecture 10. The architecture implements a self-timing mechanism to control accesses of a plurality of processors $P_N$ to a single shared memory 12. Each processor $P_i$ has a local memory 14 which can store the processor's program or data. A gate keeper $16_i$ interposed between each processor $P_i$ and the shared memory 12 controls access to the shared memory 12 for each processor $P_i$. Data and address lines couple each processor $P_i$ to its gatekeeper $16_i$. A bus arbiter 18 resolves contention for a common bus 20 coupling the various gate keepers $16_i$ to the shared memory 12 when multiple processors $P_i$ desire access to the shared memory 12 at the same time. The common bus 20 comprises data and address lines controlled by a particular gatekeeper $16_i$. The shared memory 12 has a plurality of storage locations particularly selectable in response to particular assertions of particular ones of the address lines, as is well known in the art. Each gatekeeper $16_i$ asserts a request line to the arbiter 18 when the gatekeeper $16_i$ desires to access the shared memory 12. When the arbiter 18 grants a particular gatekeeper $16_i$ access to the common bus 20 so it can access the shared memory 12, the arbiter 18 asserts a grant signal to the gatekeeper $16_i$. For particular instances, the gatekeeper $16_i$ asserts a wait signal to its processor $P_i$, causing it to halt. As is well known in the art, the gatekeeper $16_i$ functions could be designed into software executing on the various processors.

In operation, when a particular one processor $P_1$ of the architecture 10 desires to read a particular value from the shared memory 12, the processor $P_1$ provides an address to its gate keeper $16_1$. The gate keeper $16_1$ asserts a wait signal to its particular processor $P_1$ until it satisfies the read request. The gatekeeper $16_1$ requests access to the bus 20 by asserting its request signal to the arbiter 18. If multiple gatekeepers 16 are requesting access to the bus 20, then the arbiter 18 resolves the contention as is well-known in the art. One simple example for contention resolution would be to grant access on a first-come first-served basis. Eventually, the arbiter 18 asserts the grant signal to the gatekeeper $16_1$ allowing the gatekeeper to check the semaphore associated with the data at the storage location it is to read for its processor $P_1$. An incorrectly set semaphore results in the gatekeeper $16_1$ deasserting its request signal, indicating it released the bus 20. At some later time, the gatekeeper $16_1$ will try again. Eventually, the gatekeeper $16_1$ will access the particular storage location and find the semaphore correctly set. The gatekeeper $16_1$ will read the value and pass it on to its processor $P_1$, whereupon the processor $P_1$ can then continue.

For writes to the shared memory 12, the gate keeper $16_i$ need not halt the processor $P_i$ requesting the write. The processor $P_i$ can proceed with its execution until the next shared memory transaction and the gate keeper $16_i$ can write the value in parallel when the semaphore permits and the gate keeper $16_i$ gains access.

To enhance speed, the self-timed architecture 10 of FIG. 3 implements many tasks in hardware which were often implemented in software. A problem associated with the self-timed architecture 10 is that complex gatekeepers 16 associated with each processor and the arbiter 18 for bus 20 contention resolution are inefficient and add time delays and hardware costs. The gatekeeper 16 will add access delays relative to the shared memory 12 even when it is the only gatekeeper 16 requesting access to the shared memory 12. Further, as multiple gatekeepers 16 result in multiple accesses to the shared resource 12, some timing degradation occurs in resolving the bus 20 accesses for gate keepers 16 associated with processors P whose data is not ready.

The present state of the art requires a solution to a problem of efficient ordering and bus contention resolution for multiple processes while allowing some execution time variations.

SUMMARY OF THE INVENTION

The present invention provides method and apparatus for simply and efficiently maintaining an ordering of shared resource accesses and resolving bus contention while allowing some execution time variation. The hardware overhead required to realize this objective is minimal yet achieves efficient control. The resulting architecture lies someplace between a fully-static architecture and a self-timed architecture.

According to one aspect of the invention, it comprises a shared resource, a plurality of parallel processors which respond to an assertion of a first signal to access the common resource and which assert a second signal when they release the resource, and a controller having a prespecified transaction schedule. The prespecified schedule, produced prior to execution of the common task of the plurality of processors, identifies a complete set of transactions for the plurality of parallel processors. While no unscheduled transaction may occur, the time at which transactions occur may vary. The controller imposes the firing order of the schedule by asserting a single control signal to a particular processor which is next on the schedule of transactions. When that processor is ready thereafter, it automatically accesses the shared resource without requiring an arbitration or a request. After it releases the shared resource, the processor asserts a signal on the release line. The controller responds to the assertion of the release signal to advance an internal pointer to the next processor in its schedule and to assert a signal to only the next processor. The system continues to grant access to the next processor needing the shared resource, as determined by the schedule, and authorizing a subsequent processor in turn when an immediately prior processor completes its access.

A controller according to the present invention comprises a memory for a transaction schedule, a pointer to the transaction schedule memory, a mechanism to find the end of the schedule, circuitry to assert a control signal to the processor to which the pointer points, and a mechanism to increment the pointer when the release signal is asserted. Preferably for programs that are cyclically repeated, as for example in signal processing, reaching the end of the schedule list, as determined by a special character or characters, resets the counter to cycle through the schedule.

In one embodiment of the present invention, a plurality of schedules are available for various sets of tasks implemented by a plurality of processors. Each time the processors receive their programs, a transaction schedule associated with the particular set of programs is loaded into the controller.

In another preferred embodiment of the present invention, the shared resource is a common bus interconnecting the plurality of processors and one or more shared memories, and the controller has enhanced characteristics. The controller asserts memory address lines appropriate for a processor to which it is granting access. This enhances the transaction in those instances when the controller asserts the grant line prior to the time the processor is ready to access the bus. When the processor is ready, the address lines already have the correct value and the data will be immediately available, greatly speeding transaction. The controller can gain the needed address line information at compile time, which only need correlate a particular access grant with the particular address associated with the grant.

Another embodiment allows some transaction set variation for the processors. Some tasks require that limited decision path variation occur, such as a conditional branch. While this condition would mean that a priori knowledge of the particular execution tasks which will occur at execution is deficient, the task could have portions of the task which exhibit the a priori knowledge. In this instance, it is possible to have a hybrid with the present invention operative for those portions of the task which have the scheduled transactions, and to implement some other architecture for those portions needing self-timing. One possible way for the controller to determine the nature the necessary control would be, for example, to monitor the address lines or data lines of the shared bus to determine what portion of the tasks the processors were executing.

The invention offers advantages over existing methodologies because, among other reasons, the present invention does not require any complex hardware or software for contention resolution or semaphore management. Granting bus access to a single processor at any given time avoids contention. A processor requiring access to a shared resource before the controller grants required access will halt until it is granted access. The prespecified transaction schedule ensures that this does not cause deadlock and incorporates the necessary ordering of the processors' transactions. The semaphore is not needed as the schedule ensures maintenance of the proper order for reads and writes of the shared resource. Very high bandwidth to the shared memory is possible with the present invention as the bus is held for a minimal time for each transaction.

Reference to the remaining portions of the specification and the drawings realizes a further understanding of the nature and advantages of the invention.

DESCRIPTION OF A SPECIFIC EMBODIMENT

Figure 1:
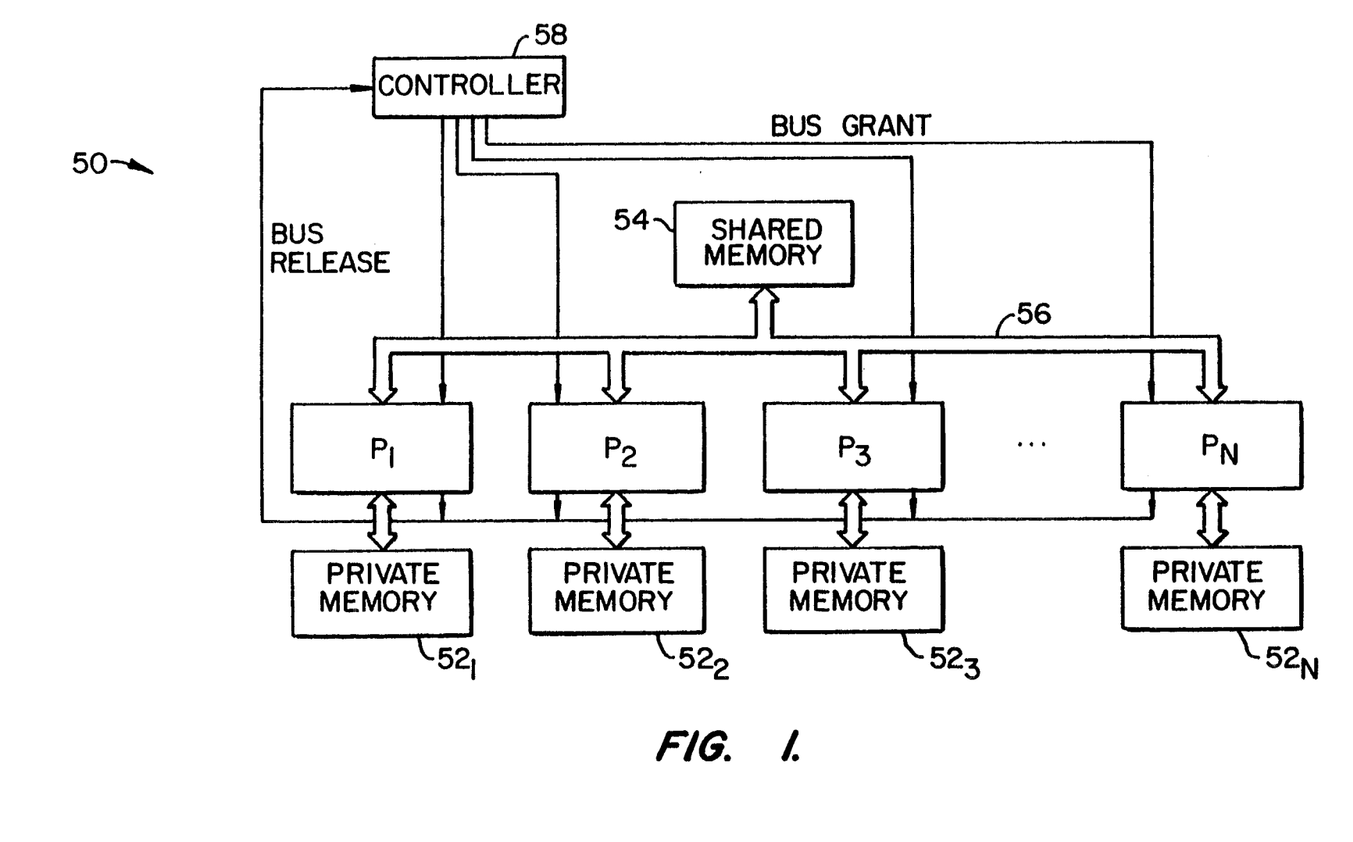
FIG. 1 is a block diagram of a preferred embodiment of the present invention.

FIG. 1 is a block diagram of a preferred embodiment of the present invention having a quasi-static architecture 50. The quasi-static architecture 50 includes a plurality of processors $P_i$ each having a private memory 52. The processors $P_i$ share a memory 54 coupled to each processor $P_i$ by a bus 56. One example of a commercially available microprocessor which may be directly used in the manner illustrated in FIG. 1 is a DSP96002 microprocessor marketed by Motorola, Inc. The shared bus 56 comprises address, data and control lines. A grant signal from a controller 58 controls each processor $P_i$'s access to any shared resource, such as the shared bus 56. The preferred embodiment requires one such signal per processor P.

In the preferred embodiment, the controller 58 asserts a grant signal to only a particular one of the processors $P_i$ at any particular time. The controller 58 incorporates a prespecified transaction schedule which identifies an order of access, for the plurality of processors $P_i$, to the shared bus 56. The schedule is quasi-static because its production at a compile requires that a compiler know with certainty which transactions are going to occur. In other words, a complete set of transactions for the plurality of processors is necessary to construct a transaction schedule identifying an order of shared resource accesses. For efficient operation, the compiler could also use available execution times or estimates of execution times. The better the execution time estimates, the more efficient will be the execution of the common task. However, the present invention does not address the formation of efficient transaction schedules. The present invention will efficiently implement both efficient and inefficient transaction schedules. The transaction schedule map simply consists of an ordered list of entries in a memory where each entry identifies a unique processor. For further information regarding scheduling, the reader is directed to Edward Ashford Lee & David G. Messerschmitt, "Static Scheduling on Synchronous Data Flow Programs for Digital Signal Processing," IEEE Transactions on Computers, No. 1, January 1987, and Edward Ashford Lee, "Architectures for Statically Scheduled Dataflow," Memorandum No. UCB/ERL M89/129, Dec. 7, 1989, which may be obtained from Electronics Research Laboratory, College of Engineering, University of California, Berkeley; both hereby expressly incorporated herein for all purposes.

After the controller 58 asserts a grant signal to a particular one processor $P_i$, it waits for an assertion of a release signal by a processor P, which can only be the processor P which was granted access. The release signals of all the processors P are coupled to the controller 58 through a wired-OR function, requiring one line for all the parallel processors P. The processor P asserts its release signal when it finishes its access of the shared resource. Thus, the controller 58 is able to assert a grant signal to a subsequent processor P as determined by the transaction schedule. The controller 58 does not need to wait for a particular processor to request access to the shared resource because the schedule provides for the correct order. The controller 58 does not have to resolve contentions for the shared bus 56 as it simply enforces an order which was previously determined at compile time. If a processor $P_i$ is waiting for access to the shared resource 56, it must idle until the controller 58 asserts the processor's grant signal. An efficient schedule's function ensures that each processor P does not waste too much time in waiting for the access. If the controller 58 grants access before a particular processor is ready, then the processor is able to immediately access the shared resource 56 as soon as the processor is ready. The controller 58 continues to cycle through the schedule, granting access to a particular processor until the processor asserts its release signal, at which time the controller 58 asserts a grant signal to a next processor. If the program cyclically repeats, then reaching an end of the schedule causes the controller 58 to return to a first entry of the schedule to cycle through the schedule again.

Figure 2:
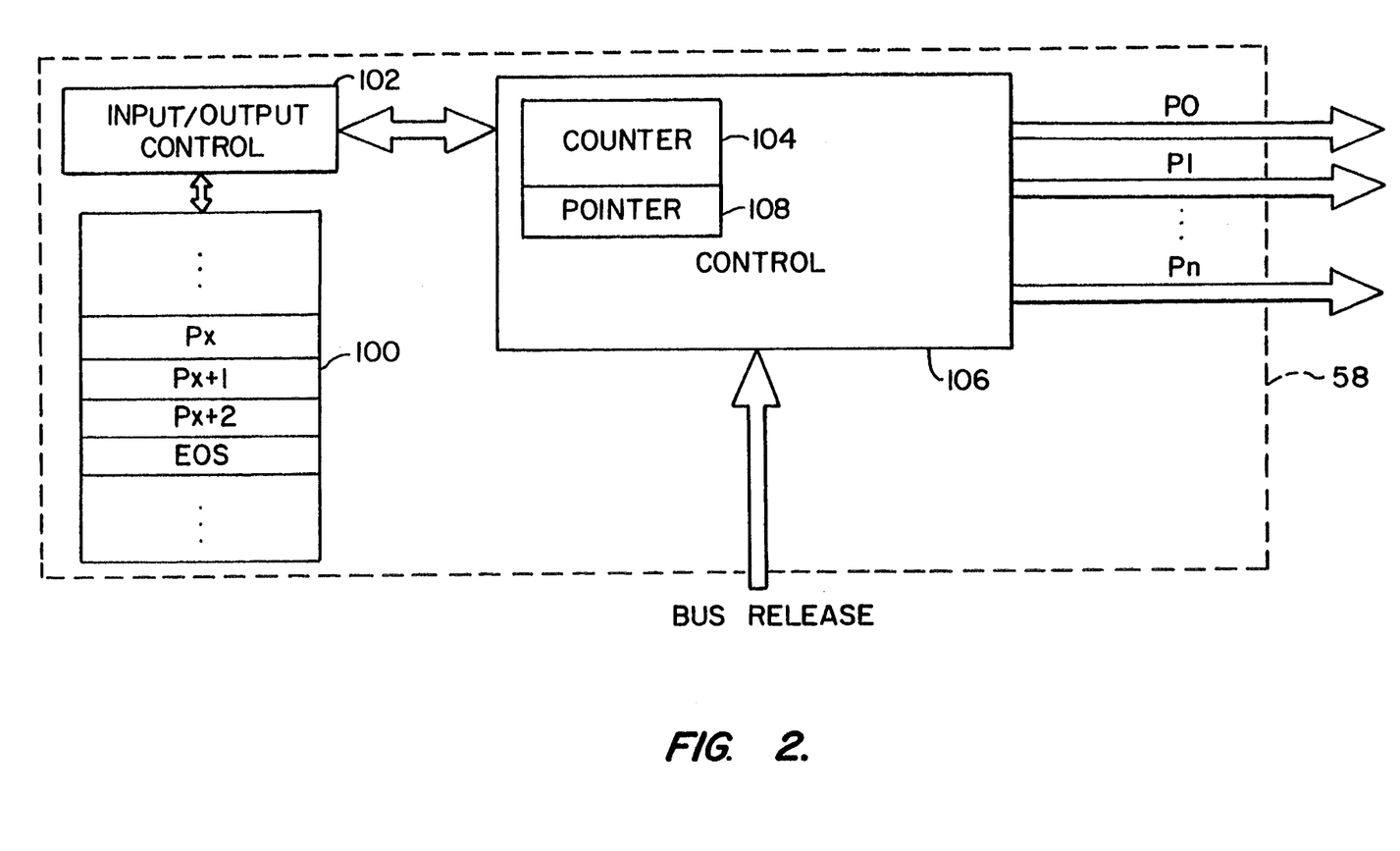
FIG. 2 is a block diagram of one embodiment of a controller 58 according to the present invention.

FIG. 2 is a detailed block diagram of a controller 58 according to a preferred embodiment of the present invention. The controller 58 includes a memory 100 for storage of the transaction schedule and an input/output control 102 for controlling reads and writes to the memory 100. A counter 104 in a control portion 106 of the controller 58 controls a pointer 108 into the memory 100 to select particular entries from the schedule. The control portion 106 includes a mechanism to assert an appropriate grant signal to a processor $P_i$ identified at the current pointer location of the transaction schedule. An assertion of the bus release signal increments the counter 104 causing the pointer 108 to access the next schedule entry. The control portion 106 then asserts the grant signal to the processor $P_i$ currently identified by the pointer 108. The use of a special end of schedule (EOS) entry in the schedule indicates to the control portion 106 that there are no more entries in the transaction schedule and also indicates whether or not the schedule should be repeated. Upon encountering the EOS, if the program cyclically repeats, the preferred embodiment resets the counter so that the pointer starts again at a first entry in the schedule.

In the preferred embodiment, the transaction schedule simply consists of a list of the processors in the order that the controller 58 is to grant them access. A person of ordinary skill in the art can implement this controller in any of a number of well-known ways. For example, as the preferred embodiment of the present invention requires a separate line for each processors's grant line, when the number of processors becomes large, the number of connections to the controller 58 becomes correspondingly large. It is possible to use an encoding mechanism to issue the grant signal to particular processors. In this embodiment, the controller provides a unique address on a grant bus which each processor then decodes. If a particular processor decodes an address corresponding to its address, then it has access to the shared resource. Alternatively, a small number of discrete decoder chips could assert particular grant lines in response to particular addresses, as is well known.

An important part of the present invention is that a controller enforces at run time, an order of accesses of shared resources determined at compile time. In many prior art systems, this requires that precise execution time for each software component be known at compile time. Additionally, the programming model for the software components could not include various features, such as conditionals, data dependent iteration and recursion which would interfere with the a priori knowledge of the set of transactions and the execution times for those transactions. The present invention acts as a method and apparatus for imposing order, therefore a compiler having accurate estimates of execution times provides for efficient task execution having some execution time variation without elaborate or complicated supervisory hardware.

Figure 4:
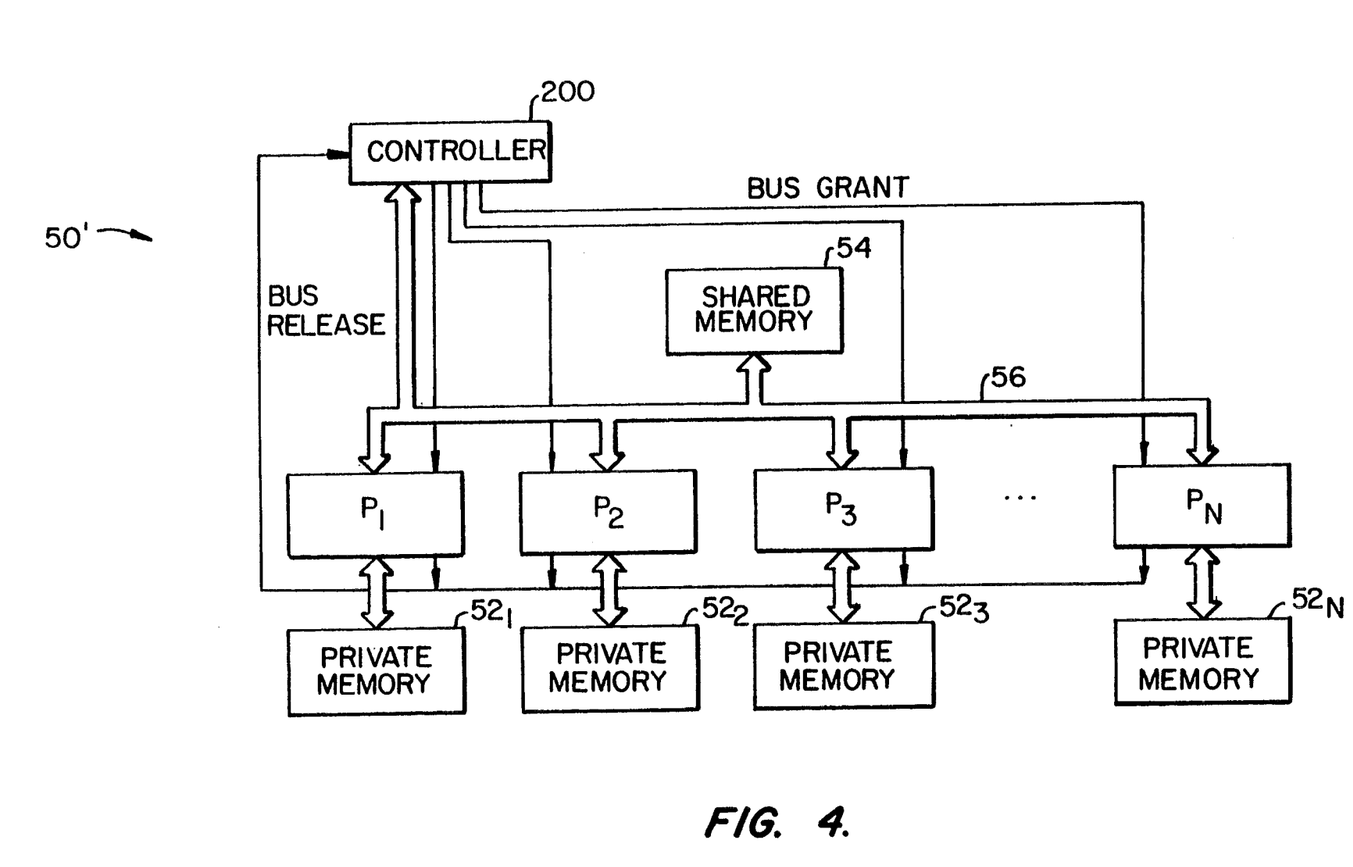
FIG. 4 is an alternate preferred embodiment of the present invention of a quasi-static architecture 50' incorporating an enhanced controller 200.

FIG. 4 is an alternate preferred embodiment of the present invention of a quasi-static architecture 50' incorporating an enhanced controller 200. The enhancement to the controller 200 results from coupling the controller 200 to the bus 56, to access one or more of the address, data or control lines. In the alternate preferred embodiment, the controller 200 accesses the address lines of the shared bus 56. In one implementation, the controller 200 drives the address lines of the shared memory 54 with the address that the processor will require when it is ready, decreasing the processor's effective access time. This information is available to the compiler when it is constructing the transaction schedule.

Figure 5:
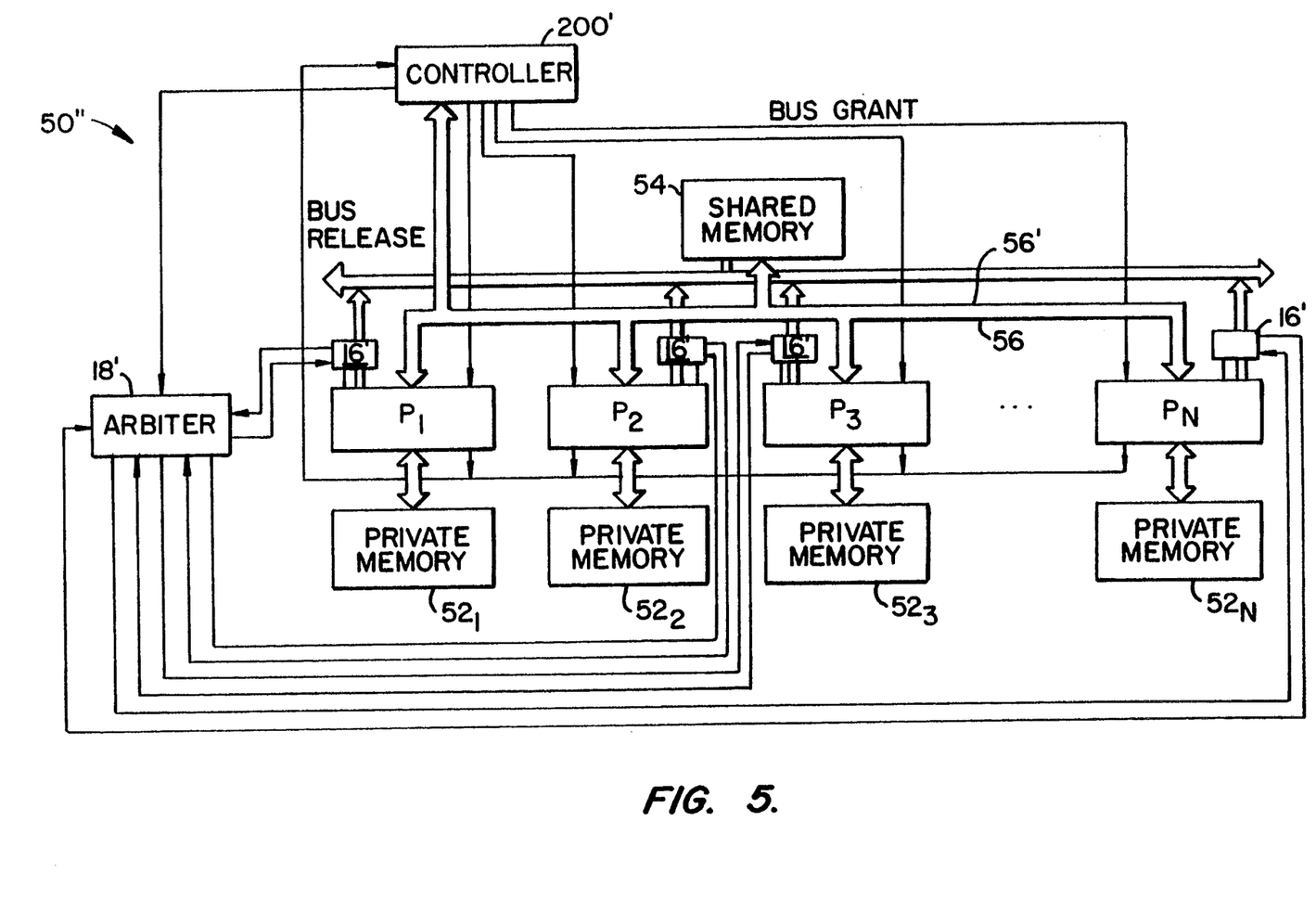
FIG. 5 is an alternate preferred embodiment of the present invention illustrating an hybrid architecture 50" incorporating quasi-static scheduling and self-timing.

FIG. 5 is an alternate preferred embodiment of the present invention illustrating an hybrid architecture 50'' incorporating quasi-static scheduling and self-timing. The hybrid architecture 50'' includes elements from the self-timing architecture 10 of FIG. 3. A second shared bus 56' couples the shared memory 54 to a plurality of gatekeepers 16'. An arbiter 18' controls access of the gatekeepers 16' by handshaking through use of request and grant signals. In addition, the arbiter 18' is responsive to a control signal from an enhanced controller 200'. An assertion of the control signal by the controller 200' disables the arbiter from asserting a grant signal to any of the gatekeepers 16.

The enhanced controller 200' monitors the address lines of the shared buses 56 and 56' to determine if the processors are in a portion of the task which is quasi-static or which requires the self-timing elements. If the system operates in the quasi-static mode, the controller 200' disables the arbiter 18' and directly grants access to the shared bus 56 for each processor P according to the transaction schedule. Upon determining that the self-timing elements are required, by monitoring the address lines, for example, the controller 200' enables the arbiter 18'. Thereafter, as long as the arbiter 18' is active, accesses to the shared memory 54 by the processors P result through use of the gatekeepers 16' as described above. The controller 200' supervises the access type implemented at any given time. In the embodiment, the controller 200' is a two-mode controller switching between self-timed ordering and quasi-static ordering.

This embodiment of the present invention operates totally transparent to the processors P. Data will be read and written to the shared resource either directly, or by use of the gatekeepers 16'. If the gatekeepers 16' are not needed, then the arbiter 18' will never grant them access to the bus. For the hybridization, different architectures are combinable with the fundamental quasi-static architecture-type of FIG. 1 to produce a hybrid architecture embodying the present invention. It is possible to incorporate the gatekeeper 16' function in software, thus requiring only a single bus 56 coupling the processors P to each other.

In conclusion, the present invention offers a simple and efficient solution to a problem of providing some execution time variations in parallel processors executing various programs. While the above is a complete description of the preferred embodiment of the present invention, various alternatives, modifications and equivalents may be used. For example, if there were two independent shared resources, a controller embodying the present invention could have a second set of control lines to each processor and incorporate a second schedule controlling accesses to the second shared resource as described above.

Also, the preferred embodiment includes a single bus connecting all the processors. It is possible that a plurality of buses connect 2 or more processors to one another. Transactions could occur directly over available busses or through overlapping processors. A controller per bus orders the transactions, and transactions occurring through an overlapping processor also provide for ordering by the overlapping processor. This improves throughout. Therefore, the appended claims define the scope of the present invention which the above description does not further limit.

What is claimed is:

1. A multiprocessor system, comprising:
   a plurality of parallel processors each simultaneously executing a particular one of a plurality of software components to execute a single task allocated among said plurality of processors, with each of said plurality of parallel processors coupled by a shared bus, wherein each of said plurality of processors is responsive to an assertion of a first signal to access said shared bus and each of said plurality of parallel processors asserts a second signal upon release of said shared bus; and
   a controller, coupled to each of said plurality of parallel processors and having a stored schedule of prespecified transactions, for asserting said first signal, according to said stored schedule, to only a first particular one of said plurality of parallel processors until said first particular one of said plurality of parallel processors asserts said second signal whereupon said controller asserts said first signal, according to said stored schedule, to only a second particular one of said plurality of parallel processors, said stored schedule being an ordered list of all transactions of said plurality of parallel processors associated with said single task and said stored schedule being defined at a compile time for said plurality of software components.

2. In a system having a plurality of parallel processors coupled to each other by a bus wherein each of the plurality of parallel processors is responsive to an assertion of a first signal to access the bus and each of the plurality of parallel processors asserts a second signal upon releasing the bus, and having a controller coupled to each of the plurality of parallel processors, the controller having a memory for storing a schedule of prespecified transactions of an ordered list of entries identifying particular ones of the plurality of parallel processors, a method of ordering shared resource accesses for the plurality of parallel processors wherein a single processing task, having an inherent ordering requirement for exchanging data between the plurality of parallel processors, is divided into a plurality of parallel processing software components for execution by said plurality of parallel processors, said method comprising the steps of:
   loading the schedule into the controller, the schedule defined at a compile time;
   granting a first particular one of the plurality of parallel processors access to the bus by selecting a first particular entry from the schedule and asserting the first signal from the controller to only said first particular one of the plurality of parallel processors specified by said first particular entry; and
   granting a second particular one of the plurality of parallel processors access to the bus by selecting a second particular one entry from the schedule in response to an assertion of the second signal to the controller by said first particular one of the plurality of parallel processors, and asserting the first signal from the controller to only a second particular one of the plurality of parallel processors specified by said second particular entry.

3. A method of ordering shared resource accesses for a plurality of parallel processors requiring a transaction schedule wherein a single processing task is divided into a plurality of parallel processing software components for execution by the plurality of parallel processors, comprising the steps of:
   providing the plurality of parallel processors coupled to each other by a bus;
   loading each of the plurality of parallel processing software components into the plurality of parallel processors, one of said software components per parallel processor;
   loading the transaction schedule into a memory of a controller, the schedule defined at a compile time, said controller coupled to each of the plurality of parallel processors;
   granting access to said bus by said controller to only a first particular one of the plurality of parallel processors, according to the transaction schedule, until said first particular one of the plurality of parallel processor releases said bus; and
   granting access to said bus by said controller to only a second particular one of the plurality of parallel processors according to the transaction schedule only after said first particular one of the plurality of parallel processor releases said bus.

4. A controller for maintaining an order of accesses to a shared bus, comprising:
   a memory for storing a transaction schedule established at a compilation time of a plurality of software components for a single task simultaneously executed on a plurality of parallel processors coupled to each other by a shared bus wherein each of said plurality of software components is derived from a complete set of transactions to be executed by said plurality of parallel processors known at said compilation time with each of said plurality of processors responsive to an assertion of a first signal to access said bus and each of said plurality of parallel processors asserting a second signal upon releasing said bus;
   a pointer, coupled to said memory, for accessing particular entries of said transaction schedule, said pointer selecting a first and a second particular entry of said transaction schedule according to a counter, with said pointer selecting said first particular entry when said counter has a first value and said pointer selecting said second particular entry when said counter has a second value, said counter initially at said first value;

means, coupled to said pointer, for asserting said first signal to particular ones of said plurality of parallel processors according to said transaction schedule, said means for asserting said first signal asserting said first signal to only a first particular one parallel processor when said pointer identifies said first particular entry of said transaction schedule and said first signal asserting means asserting said first signal to only a second particular one parallel processor when said pointer identifies said second particular entry of said transaction schedule; and means, coupled to said counter, for changing said first value to said second value in response to an assertion of said second signal by said first particular one parallel processor.

5. A parallel processing architecture, comprising:

a plurality of parallel processors, coupled to each other through a bus, simultaneously executing a plurality of software components to complete a predefined task with each of said plurality of parallel processors responsive to a first signal to access said bus and each of said plurality of parallel processors asserting a second signal upon releasing said bus; and a controller, coupled to each of said plurality of parallel processors, including a transaction schedule, said controller asserting said first signal to only a first particular one of said plurality of parallel processors according to said transaction schedule and asserting said first signal to only a second particular one of said plurality of parallel processors according to said transaction schedule upon said first particular one of said plurality of parallel processors asserting said second signal to said controller, said transaction schedule defined at a compile time.

6. The architecture of claim 5, wherein said controller is coupled to said bus and said controller asserts address signals at appropriate ones of address lines of said bus for each particular processor of said plurality of parallel processors for which said controller is asserting said first signal.

7. The architecture of claim 5, wherein said controller is coupled to said bus, said transaction schedule has a first and a second portion, and said controller further comprises:

means, coupled to said bus, for monitoring execution paths of said plurality of parallel processors by sampling lines of said bus to determine if said plurality of parallel processors are in a first part of said predefined task and to determine if said plurality of parallel processors are in a second part of said predefined task; and means, coupled to said controller and to said means for monitoring, for using said first portion of said transaction schedule in said controller if said plurality of parallel processors are in a first part of said predefined task and for using said second portion of said transaction schedule if said plurality of parallel processors are in said second part of said predefined task.

8. The architecture of claim 5, wherein said controller is coupled to said bus and said architecture further comprises:

means, coupled to said bus, for monitoring execution paths of said plurality of parallel processors by sampling lines of said bus to determine if said plurality of parallel processors are in a first part of said predefined task and to determine if said plurality of parallel processors are in a second part of said predefined task;

means, coupled to said plurality of parallel processors, for implementing self-timing transactions of said plurality of parallel processors, said self-timing implementation means responsive to a control signal from said controller for enabling said self-timing implementation means; and means, coupled to said means for monitoring and to said controller, for implementing said transaction schedule when said plurality of parallel processors are in said first part of said predefined task and for enabling said self-timing implementation means when said plurality of parallel processors are in said second part of said predefined task.

* * * * *